April 18, 1939. E. S. CORNELL, JR 2,155,080
ELBOW AND KINDRED PIPE FITTINGS
Original Filed Oct. 30, 1934
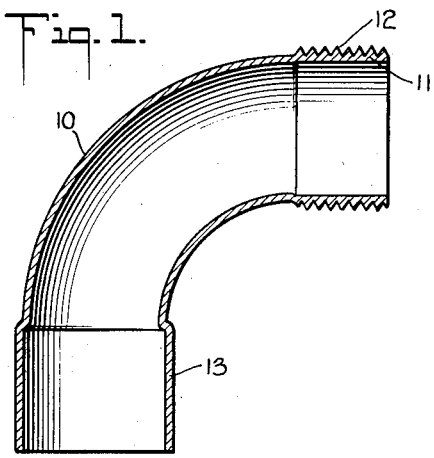
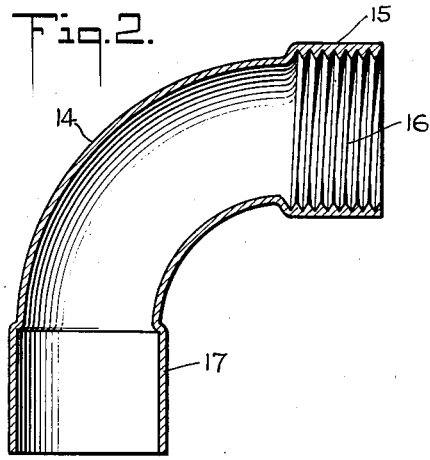
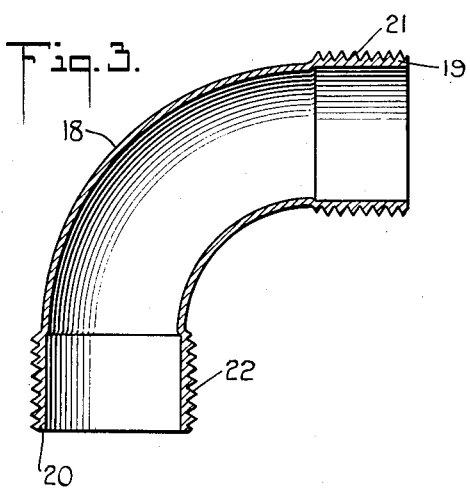
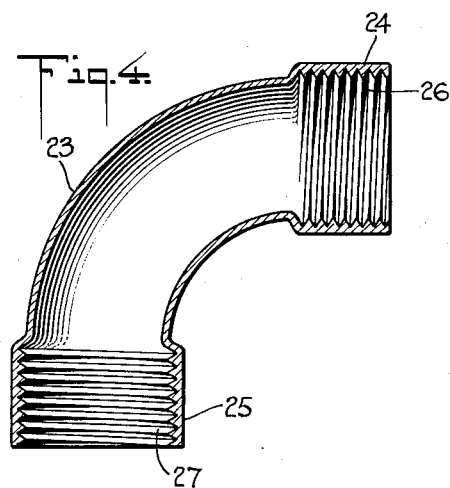
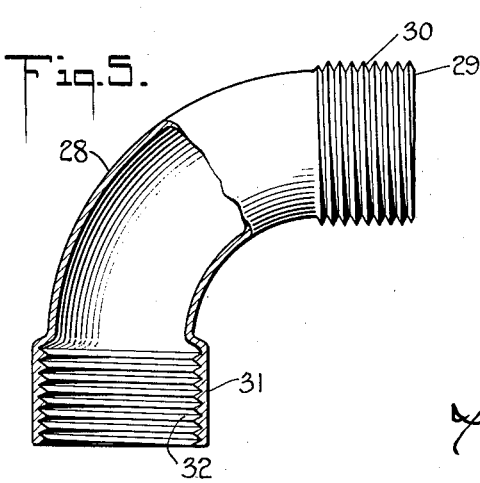
INVENTOR
Edward S. Cornell, Jr.
BY
HIS ATTORNEY Patented Apr. 18, 1939

2,155,080

UNITED STATES PATENT OFFICE 2,155,080

ELBOW AND KINDRED PIPE FITTINGS

Edward S. Cornell, Jr., Larchmont, N. Y., assignor to American Radiator Company, New York, N. Y., a corporation of New Jersey Application October 30, 1934, Serial No. 750,644
Renewed January 7, 1939

6 Claims. (Cl. 285—211)

My present invention relates to elbow and kindred pipe fittings and more particularly of wrought non-ferrous metal, especially of predominant copper content.

My present invention is directed mainly to elbows and kindred pipe fittings formed from cold wrought non-ferrous metal, having an original wall thickness insufficient to bear the usual threads thereon, the derived fitting having an area of the passage therethrough substantially free from obstruction, serving to substantially restrict or disturb the flow of material therethrough.

The derived pipe fitting, such as the elbow forming the subject matter of my present invention, may have threads located at one or both of its ends, and either interiorly or exteriorly or both.

I am aware that cast fittings such as elbows having interior or exterior telescoped connection are old in the art, but such fittings have the disadvantage of being non-homogeneous in character, and not proof against leakage, of low tensile and rupture strengths, and of high unit weight per given tensile and rupture strengths. So far as I am aware of, my fitting is novel, in that the wall of the body of the fitting is of relatively thin wrought metal, particularly non-ferrous metal, the ends being thickened to be capable of receiving either an internal or external thread adapted for connection to a threaded fitting, or a threaded end of a pipe, or to receive the threads of a threaded fitting or coupling, and in addition which is capable of having one of the ends telescopingly connected by sweat jointing or externally with the end of a pipe or fitting.

In my co-pending application, Serial No. 755,567, filed December 1, 1934, entitled Improved method of making wrought non-ferrous metal elbows, now United States Patent No. 2,078,195, granted April 20, 1937, I have described and claimed my improved method or process of manufacturing the elbows forming the subject matter of my present invention, and therefore, the present invention is directed to the novel details of construction of the article per se.

An important feature of my present invention is the provision of a thickened end in a wrought non-ferrous metal elbow or kindred fitting, having a body of relatively thin walls and having either or both of its ends capable of receiving either an internal or external thread, and constructed as a whole not to interfere with the full flow of fluid through the fitting.

Further features and objects of my invention will be more fully understood from the following detail description and the accompanying drawing, in which—

Fig. 1 is a central sectional elevation of one form of my invention;

Fig. 2 is a central sectional elevation of another form of my invention;

Fig. 3 is a central sectional elevation of a still further form of my invention;

Fig. 4 is a central sectional elevation of a still further form of my invention, and Fig. 5 is an elevation partly in section of a still further form of my invention.

Referring to the drawing and particularly to Fig. 1, 10 designates, in section, the arcuate, i. e., body portion of an elbow of relatively thin wall thickness, having at one end 11 a thickened cylindrical portion having an inner diameter which may be equal to or slightly greater than the internal diameter of the arcuate or body portion 10, and of an outer diameter sufficiently greater than the inner diameter so that the resulting wall thickness of the material is sufficient to enable threads 12 to be cut on the outside thereof. The threads 12 may be the usual and ordinary pipe threads and the thickness of the material of such thickened end 11 measured between the bottom of the threads 12 and the inner diameter of the thickened end may be substantially equal to the wall thickness of the arcuate or body portion 10. The threads 12 are shown as male threads and therefore it is possible to screw onto such threads the inner threads of any suitable fitting such for example as a coupling or a union or the like, provision being made for the full flow of the fluid at such screw-threaded connection.

The end 13 of the arcuate portion 10 remote from the stated exteriorly threaded end 11, is of sleeve-like or cup formation, and may have an inner diameter substantially equal to or slightly greater than the outer diameter of the arcuate or body portion 10, and an outer diameter such that the thickness of the material between such outer and inner diameters provides a wall for the end 13 substantially equal to the thickness of the wall of the arcuate or body portion 10. The inner diameter of the end 13 is preferably substantially uniform throughout its length, and substantially equal to the outer diameter of a pipe or the end of a fitting, telescoped interiorly into the end 13, and sweat jointed thereto, thereby insuring, by reason that the thickness of the wall of such pipe or fitting is equal to the thickness of the wall of the arcuate or body portion 10, that full flow of fluid through such connection and through the arcuate or body portion 10 is provided. There is thus provided a pipe fitting of wrought non-ferrous metal which is homogeneous in character, possessing the advantageous attributes of wrought metal, and which is adapted to provide full flow of fluid therethrough regardless of the type of fitting which may be secured to either or both ends thereof.

Referring now to Fig. 2, the arcuate or body portion 14 is similar to the arcuate or body portion 10, of Fig. 1, and at one end thereof is an enlarged, thickened end 15, tubular in form and having threads 16 formed on the interior surface thereof. The thickness of the wall of the end 15 measured between the bottom of its threads 16 and its outer diameter, is substantially equal to the thickness of the wall of the arcuate or body portion 14. Such threads 16 are adapted to receive the threaded end of a pipe or fitting of wrought metal, and the diameter of the bottom of the threads 16 is such that when the end of the pipe or fitting is screwed therein, the interior diameter of such pipe or fitting is substantially equal to the passage through the arcuate or body portion 14, so that a full flow of fluid through the pipe or fitting passes unobstructed therethrough.

The end of the arcuate or body portion 14, remote from the stated end 15 is cupped, i. e., having integrally formed a sleeve 17 having a wall thickness substantially equal to the wall thickness of the arcuate or body portion 14, and having an inner diameter substantially equal to or slightly greater than the outer diameter of the arcuate or body portion 14. The inner diameter of the sleeve 17 is substantially constant through its length, and is smooth, and is related to the outer diameter of the pipe or fitting adapted to be associated therewith to provide a sweat joint connection by telescoping of the end of a pipe or fitting and the sleeve 17, the thickness of the wall of the pipe and/or fitting being substantially equal to the thickness of the wall of the arcuate or body portion 14, thereby providing for a full flow of fluid therethrough.

Referring now to Fig. 3 there is shown a further embodiment of my invention in which the arcuate or body portion 18, of wrought non-ferrous metal, is provided at one end with a thickened portion 19, and at the opposite end with a similar thickened portion 20, such portions 19 and 20 being tubular in form and each having an internal diameter substantially equal to or slightly greater than the internal diameter of the bore of the arcuate or body portion 18. The end portions 19 and 20 are of sufficient thickness to permit the cutting thereon of external threads 21 and 22 respectively, to permit screw-threaded attachment to the elbow thereat.

Fig. 4 illustrates a further embodiment of my invention, the arcuate or body portions 23 being of wrought non-ferrous metal, and having, at one end a thickened portion 24, and at the opposite end a similar thickened portion 25, both of these end portions being tubular in form, of a wall thickness sufficient to bear threads and having an inner diameter substantially equal to the diameter of the bottom of the threads of a pipe or other fitting to be secured thereto. In the end portion 24 are formed the female threads 26, while in the end portion 25 are formed the female threads 27. These threads are adapted to receive the external threads of a pipe or fitting, the internal diameter of the pipe or fitting being ordinarily substantially equal to the inner diameter of the passage through the arcuate or body portion 23, so that a full flow of fluid passing through the pipe or fitting is permitted by the arcuate or body portion 23.

Referring now to Fig. 5, wherein is shown a still further embodiment of my invention, the arcuate or body portion 28 is of wrought non-ferrous metal, such as copper, and at one end has a thickened portion 29 substantially similar to the thickened end portion 11 as shown in Fig. 1 and/or the thickened end portion 19 as shown in Fig. 3 and on such thickened end portion 29 is formed the external threads 30, such threads being similar in all respects to the threads 12 and/or the threads 21 as shown in Figs. 1 and 3 respectively. The inner diameter of the end portion 29 is substantially equal to or slightly greater than the diameter of the passage through the arcuate or body portion 28, and the thickness of the wall of the end portion 29 is sufficiently great so that when the threads 30 are cut on the exterior thereof the remaining portion or thickness of the wall will be substantially equal to the thickness of the wall of the arcuate or body portion 28.

At the end of the arcuate or body portion 28, remote from the end portion 29, is a portion 31 which is substantially similar in size, form and appearance in proportion to the size of the arcuate or body portion 28, similarly as the end portions 15 and 24 are to the arcuate or body portions 14 and 23 respectively. The end portion 31 is provided with the female threads 32 arranged to receive the exteriorly threaded ends of a pipe or fitting.

I have shown and illustrated my invention in a variety of embodiments, to meet the usual and other requirements of pipe lines, plumbing systems, etc., but obviously my invention is applicable to other forms and requirements than those specifically referred to and/or above illustrated.

Essentials of my invention are, that the fitting is of cold wrought non-ferrous metal, preferably of high copper content, that the fitting throughout is integral, that is to say, without joint, that the wall thickness of the body of the fitting is insufficient to carry thread, and that the end portions are each of themselves integral, that is to say without joint, and integrally, that is to say without joint, connected to the body of the fitting. Such elbow or equivalent is preferably made by the improved method above described and claimed in my co-pending application above referred to.

The resultant elbow or equivalent is of relatively light unit weight, possesses superior tensile and crushing strengths, thus permitting smaller "sizes" of bore and wall thickness as compared with cast and other prior art fittings, possesses a high co-efficient of flexibility, etc. and of pleasing appearance. Further, my fitting lends itself to the conventional thread connection of installation in systems of piping, or optionally to sweat joint connection.

My fitting is preferably of full flow construction, the diameter of the passage therethrough being substantially equal to the inner diameter of the pipe or fitting with which it is associated, to obviate restriction or impediment to the passage of fluid therethrough.

By the term "non-ferrous metal" as employed in the claims, I connote metal which is substantially devoid of iron content and which at the temperature of melting of brass alloys in the presence of air, gives rise to the formation of oxide of such non-ferrous metal.

I claim:

1. An improved elbow of wholly integral wholly cold wrought, homogeneous, non-ferrous metal, having a free unrestricted passage of substantially constant diameter therethrough and having a body wholly of integral wrought homogeneous non-ferrous metal having a wall dimension incapable of bearing a thread, an end thereof having a wall thickness capable of and bearing a thread, the thickness of the metal of said threaded end measured between the bottom of the threading and the smooth face of said end being equal to the wall dimension of said body, the aforesaid being each of itself integral and without joint and integrally and without joint united to one another respectively.

2. An improved elbow of wholly integral wholly cold wrought, homogeneous, non-ferrous metal, having a passage of substantially constant diameter therethrough and having a body wholly of integral wrought homogeneous non-ferrous metal having a wall thickness incapable of bearing a thread, an end thereof having a wall thickness capable of and bearing an external thread for attachment to a threaded pipe or fitting, the thickness of the metal of said threaded end measured between the bottom of the threading and the smooth face of said end being equal to the wall dimension of said body, the aforesaid being each of itself integral and without joint and integrally and without joint united to one another respectively.

3. An improved pipe fitting of wholly integral wholly cold wrought, homogeneous, non-ferrous metal, having a passage of constantly substantial diameter therethrough, and having a body wholly of integral wrought homogeneous non-ferrous metal having a wall thickness incapable of bearing a thread, each end thereof having a wall thickness capable of and bearing external threads to permit threaded attachment thereof to a female member of a pipe system, the thickness of the metal of said threaded end measured between the bottom of the threading and the smooth face of said end being equal to the wall dimension of said body, the aforesaid being each of itself integral and without joint and integrally and without joint united to one another respectively.

4. An improved elbow of wholly integral wholly cold wrought, homogeneous, high copper content metal, having a body wholly of integral wrought homogeneous metal of high copper content a wall dimension incapable of bearing a thread, one end thereof having a wall thickness capable of and bearing other external threads for attaching the same to the female member of a piping system, the thickness of the metal of said threaded end measured between the bottom of the threading and the smooth face of said end being equal to the wall dimension of said body, the other end being of substantially constant internal diameter and smooth through its length for attachment to a pipe or pipe fitting by a sweat joint connection, the aforesaid being each of itself integral and without joint and integrally and without joint united to one another respectively.

5. An improved elbow of wholly integral wholly cold wrought, homogeneous, high copper content metal, having a body wholly of integral wrought homogeneous metal of high copper content passage of substantially constant internal diameter extending therethrough, the wall thickness of the body being incapable of bearing a thread, one end of the elbow having a wall thickness capable of and bearing an internal thread for threaded attachment thereof to the male end of a pipe or pipe fitting, the thickness of the metal of said threaded end measured between the bottom of the threading and the smooth face of said end being equal to the wall dimension of said body, the opposite end having a wall thickness substantially that of the body, permitting attachment of such opposite end to a pipe or pipe fitting by sweated joint connection, the aforesaid being each of itself integral and without joint and integrally and without joint united to one another respectively.

6. An improved elbow of wholly integral wholly cold wrought, homogeneous, high copper content metal, having a body wholly of integral wrought homogeneous metal of high copper content a passage of substantially constant diameter extending therethrough and of a wall thickness incapable of bearing a thread, one end of the elbow having a wall thickness capable of and bearing an external thread to receive the internal thread of a pipe fitting, the opposite end having a wall thickness capable of and bearing an internal thread for receiving the external thread of a pipe or pipe fitting, the thickness of the metal of each of said threaded ends measured between the bottom of the threading and the smooth face of such ends being equal to the wall dimensions of said body the elbow as a whole affording substantially constant effectual bore when connected to a pipe or pipe fitting at its respective ends, the aforesaid being each of itself integral and without joint and integrally and without joint united to one another respectively.

EDWARD S. CORNELL, Jr.